United States Patent [19]

Iida

[11] Patent Number: 4,483,295
[45] Date of Patent: Nov. 20, 1984

[54] CONTROL DEVICE FOR MULTICYLINDER ENGINE

[75] Inventor: Katsuyoshi Iida, Higashihiroshima, Japan

[73] Assignee: Mazda Motor Corporation, Hiroshima, Japan

[21] Appl. No.: 476,276

[22] Filed: Mar. 17, 1983

[30] Foreign Application Priority Data

Mar. 24, 1982 [JP] Japan ................................. 57-47894

[51] Int. Cl.³ .............................................. F02D 5/14
[52] U.S. Cl. .................................... 123/425; 123/419
[58] Field of Search ............... 123/425, 414, 423, 424, 123/419, 435, 422, 417; 73/35

[56] References Cited

U.S. PATENT DOCUMENTS

| | | | |
|---|---|---|---|
| 4,300,503 | 11/1981 | Deleris et al. | 123/425 |
| 4,331,117 | 5/1982 | Ginsburgh | 123/425 |
| 4,354,378 | 10/1982 | Oshiage et al. | 123/425 |
| 4,356,551 | 10/1982 | Iwase et al. | 123/425 |
| 4,357,919 | 11/1982 | Hatter et al. | 123/425 |
| 4,370,964 | 2/1983 | Muranaka et al. | 123/425 |
| 4,375,668 | 3/1983 | Leung et al. | 123/425 |
| 4,388,902 | 6/1983 | Latapie | 123/425 |
| 4,413,599 | 11/1983 | Shigematsu et al. | 123/425 |

*Primary Examiner*—Raymond A. Nelli
*Attorney, Agent, or Firm*—Burns, Doane, Swecker & Mathis

[57] ABSTRACT

A control device for a multicylinder engine comprising a knocking detector for detecting the occurrence of knocking, a crank angle sensor for generating a signal indicative of the crank angle, an engine operating condition control device for governing the engine operating condition, and a control circuit for identifying one of the engine cylinders in which knocking has actually occurred, in dependence on both outputs from the detector and the crank angle sensor. The control circuit operates to cause the engine operating condition control device to control the at least one of the engine cylinders when the output from the detector is lower than a predetermined value, but to control all of the engine cylinders when it is higher than the predetermined value.

6 Claims, 4 Drawing Figures

CONTROL DEVICE FOR MULTICYLINDER ENGINE

BACKGROUND OF THE INVENTION

This invention generally relates to a multicylinder internal combustion engine of a type generally used in automotive vehicles and, more particularly, to a control device therefor designed to minimize the occurrence of engine knocking.

The control device to which this invention is applicable includes an ignition timing control device, an exhaust gas recirculating (EGR) control device, an air-fuel ratio control device and the like. However, for the purpose of illustration of this invention, the ignition timing control device for the multicylinder automobile engine will be referred to as one example of the numerous control devices to which this invention is applicable.

In general, the ignition timing control device for the multicylinder engine controls the engine cylinders in a predetermined firing order at different ignition timings according to the engine operating condition. It has long been well known that, in the event that a knocking occurs in the engine, the occurrence of the engine knocking can be minimized or substantially eliminated if the ignition timing is retarded a certain angle. Where the ignition timings in all of the engine cylinders are equally controlled as hereinabove described, the ignition timings in those engine cylinders are equally retarded once the knocking has taken place in one of the engine cylinder. This method brings about reduction in engine power output and mileage as the retardation of the respective ignition timings in the remaining engine cylinder is good for nothing, in view of the fact that the engine cylinders have their own characteristics different from one cylinder to another due to, for example, air-fuel charges of different air-fuel mixing ratio and, for a given engine operating condition, some of the engine cylinders will be susceptible to knocking and the others will not.

In order to substantially eliminate the above discussed problem, an ignition timing control device has been provided which is operable to minimize the occurrence of knocking by detecting the occurrence of knocking in one or some of the engine cylinders by the use of a knocking detector and retarding the ignition timing in the or each engine cylinder, in which the knocking has occurred, according to the intensity of knocking. An example of this prior art ignition timing control device designed to minimize the occurrence of the knocking without reduction in engine power output and mileage is disclosed in, for example, Japanese patent publication No. 56-50114 published on Nov. 26, 1981.

According to this publication, an ignition timing control device is disclosed comprising a knocking detector including a sensor and a bandpass filter and operable to detect the occurrence of knocking; a knocking level detector operable upon receipt of an output from the knocking detector to determine the intensity of knocking; a spark advance level determining circuit for selecting the spark advance angle, through which the ignition timing is to be advanced, depending on the intensity of the knocking; a ignition timing determining circuit for controlling the ignition timing according to the spark advance angle determined by the spark advance level determining circuit; and a knocked cylinder detector for counting the number of firing control pulses, which provide the basis for ignition signals with which the respective engine cylinders are fired, subsequent to the detection of one of the ignition signals which is associated with the reference engine cylinder, to identify one or more of the engine cylinders in which the knocking has actually occurred, whereby the ignition timing for each of the engine cylinders can be controlled on a feedback control scheme by detecting the occurrence of knocking in the individual engine cylinders. In other words, the control device according to this publication is so designed that, when knocking has occurred in one or more of the engine cylinders, the respective ignition timings for such one or more engine cylinders can be controlled.

On the other hand, it is generally well known that, once knocking has occurred in, for example, one of the engine cylinders during a particular engine operating condition in which it tends to occur readily, such as a high load, low speed operating condition, not only does the level of such knocking tends to be relatively high, but also the occurrence of the high level knocking in such one of the engine cylinders tends to induce knocking in the other engine cylinders. However, with the prior art control device of the type disclosed in the above mentioned publication, since even though the high level knocking has occurred in, for example, one of the engine cylinders, only the ignition timing for such one of the engine cylinders is controlled despite the predictability of any possible occurrence of knocking also in the other engine cylinders, and the control of each of the other engine cylinders will not be effected unless knocking has actually occurred. Thus, in the event of the actual occurrence of the high level knocking in one of the engine cylinders, the control of the ignition timing for each of the other engine cylinders tends to be belated and, therefore, the possible occurrence of knocking in the other engine cylinders cannot be successfully avoided.

SUMMARY OF THE INVENTION

Accordingly, this invention has been developed with a view to substantially eliminating the above described disadvantages and inconveniences inherent in the prior art control device and has for its essential object to provide an improved control device effective to avoid any possible occurrence of knocking in some of the engine cylinders when the level of knocking occurring in the other engine cylinder or cylinders is higher than a predetermined value.

Another important object of this invention is to provide an improved control device of the type referred to above, which is effective to avoid any possible reduction in engine power output and mileage.

According to this invention, the above described objects can be accomplished by providing a control device for a multicylinder engine, which comprises a knocking detecting circuit means for detecting the occurrence of knocking in dependence on a signal indicative of vibrations of the engine, a crank angle sensor for generating a signal indicative of the crank angle of the engine, an engine operating condition control device for governing the operating condition of the engine, and a control circuit means for identifying one of the engine cylinders, in which the knocking has actually occurred, in dependence on both the signal from the crank angle sensor and an output signal from the detecting circuit means and operable in such a manner that the control to be done by the operating condition control device can be effected to said one of the engine cylinders to suppress the subsequent occurrence of knocking when the output signal from the detecting circuit means is lower than a predetermined value, but to all of the engine cylinders when said output signal from the detecting circuit means is higher than the predetermined value.

BRIEF DESCRIPTION OF THE DRAWINGS

These and other objects and features of this invention will become readily understood from the following detailed description taken in conjunction with preferred embodiments thereof with reference to the accompanying drawings, in which.

DETAILED DESCRIPTION OF THE EMBODIMENT

Figure 1:
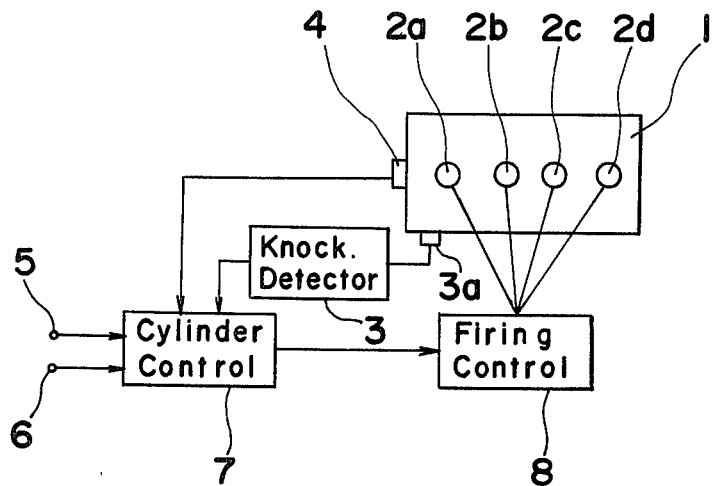
FIG. 1 is a schematic diagram showing a multicylinder internal combustion engine having an ignition timing control device according to one embodiment of this invention.

Before the description of this invention proceeds, it is to be noted that like parts are designated by like reference numerals throughout the several views of the accompanying drawings.

Figure 2:
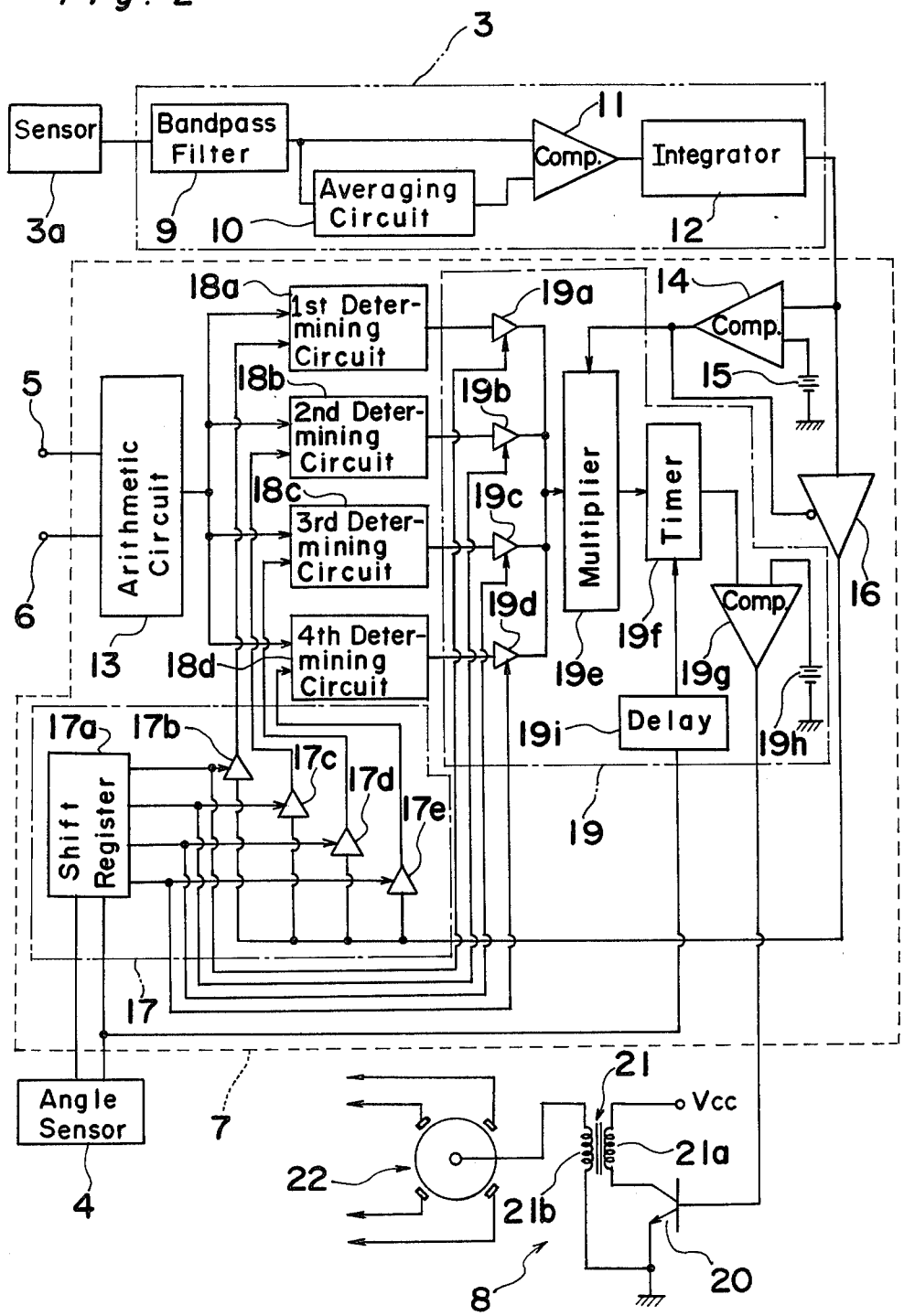
FIG. 2 is a circuit block diagram showing the details of the ignition timing control device shown in FIG. 1.

Referring first to FIGS. 1 and 2, an automobile power plant comprises a multicylinder internal combustion engine 1 having a plurality of, for example, first to fourth, cylinders each having a respective spark plug 2a, 2b, 2c and 2d for combusting fuel, and a control device designed according to this invention to minimize the occurrence of engine knocking. The control device so far illustrated is in the form of an ignition timing control device and comprises a vibration sensor 3a for detecting, and generating an output signal indicative of, vibrations of the engine 1, a knocking detector 3 for detecting the occurrence of knocking in the engine 1 according to information derived by the output signal from the sensor 3a, a crank angle sensor 4 for detecting the angle of rotation of a crank shaft (not shown) and for generating both a reference cylinder signal indicative of a particular one of the first to fourth engine cylinders and a reference angle signal indicative of a signal at a predetermined angle of rotation of the crankshaft, a cylinder control unit 7 and a spark plug ignition actuator in the form of a control unit 8 operable in response to an output from the cylinder control unit 7 to control a timing parameter of the control unit 8 for igniting the spark plugs 2a to 2d in a predetermined firing order, which control unit 8 forms, in the illustrated embodiment, an engine operating condition control device for controlling the operating condition of the engine 1. The cylinder control unit 7 is so designed as to calculate a reference ignition timing, namely, spark timing, in dependence on the engine speed, detected by an engine speed sensor (not shown) coupled to an engine speed signal terminal 5, and the negative pressure developed in the fuel intake system (not shown) of the engine 1, which negative pressure is detected by a pressure sensor (not shown) coupled to a pressure signal terminal 6, and as to correct the ignition timing for some or all of the engine cylinders in dependence on the output signals respectively from the knocking detector 3 and the crank angle sensor 4. More specifically, the cylinder control unit 7 is so designed as to identify, from both of said output signals, some or all of the engine cylinders in which knocking has taken place and as to operate in such a manner that, when the level of the knocking is lower than a predetermined value, the reference ignition timing for some or all of the engine cylinders in which the knocking has actually taken place and that for the remaining engine cylinders are retarded and advanced, respectively, whereas when the knocking level is higher than the predetermined value, the reference ignition timing for all of the engine cylinders is retarded.

The details of each of the circuits 3, 7 and 8 are shown in FIG. 2 and, therefore, particular reference will now be made to FIG. 2.

The knocking detector 3 comprises a bandpass filter 9 capable of passing the frequency component of the output signal from the vibration sensor 3a which is attributable to the occurrence of knocking, an averaging circuit 10 for averaging the output from the bandpass filter 9, a comparator 11 for comparing the output from the bandpass filter 9 with output from the averaging circuit 10, and an integrator 12 for integrating the output from the comparator 11.

The cylinder control circuit 7 comprises an arithmetic circuit 13 operable in response to both of the engine speed signal and the negative pressure signal, fed respectively from the terminals 5 and 6, for determining the reference ignition timing, a comparator 14 for comparing the output from the knocking detector 3 with a reference voltage fed from a reference voltage source 15, a gating circuit 16 for passing the output from the knocking detector 3 therethrough in dependence on the output from the comparator 14, and a knocked cylinder identifying circuit 17 operable upon receipt of both the output from the gating circuit 16 and that from the crank angle sensor 4 for identifying some or all of the engine cylinders in which knocking has actually taken place.

The knocked cylinder identifying circuit 17 includes a shift register 17a adapted to receive the outputs from the crank angle sensor 4 for identifying the individual engine cylinders and having output terminals equal in number to the number of the engine cylinders, and gating circuits 17b, 17c, 17d and 17e, each operable in response to a control signal, fed from the corresponding output terminal of the shift register 17a, to pass a knocking signal from the gating circuit 16 therethrough.

The cylinder control unit 7 also comprises a ignition timing determining circuit 18a, 18b, 18c and 18d provided for each engine cylinder and operable in such a manner that, when a cylinder control signal is applied thereto from the associated gating circuit 17b, 17c, 17d or 17e of the knocked cylinder identifying circuit 17, the related reference ignition timing determined by the arithmetic circuit 13 is retarded a predetermined angle to establish an actual ignition timing, but when and so long as no cylinder control signal is applied thereto from the associated gating circuit 17b, 17c, 17d or 17e of the knocked cylinder identifying circuit 17, the related reference ignition timing determined by the arithmetic circuit 13 is advanced a predetermined angle, corresponding to the corresponding engine cylinder, to establish an actual ignition timing, and a distributor control circuit 19. The distributor control circuit 19 includes first to fourth gating circuits 19a, 19b, 19c and 19d for selectively outputting one at a time the ignition timings respectively from the first to fourth ignition timing determining circuits 18a to 18d according to cylinder identifying signals fed from the shift register 17a, a multiplier 19e operable in such a manner that, when the output from the comparator 14 is applied thereto, all of the ignition timings from the respective determining circuits 18a to 18d are retarded a predetermined angle, but when no output from the comparator 14 is applied thereto, the signals from the respective gating circuits 19a to 19d which are indicative of the respective ignition timings for the associated engine cylinders are allowed to pass therethrough, a timer 19f adapted to receive the ignition timing signal from the multiplier 19e and, also, the signal from the crank angle sensor 4 to charge a signal corresponding to the ignition timing and also adapted to be triggered by the signal from the crank angle sensor 4 to discharge such signal so charged, a comparator 19g for comparing the output from the timer 19f with a reference voltage fed from a reference voltage source 19h and generating an output signal when the output from the timer 19f attains a value equal to the reference voltage, and a delay circuit 19i.

The spark plug igniting control unit 8 comprises a transistor 20 adapted to be brought in a non-conducting state when the output from the distributor control circuit 19 is applied to the base thereof, an ignition coil assembly 21 having primary and secondary windings 21a and 21b and operable in such a manner that, when the transistor 20 is switched off, the flow of an electric current from an electric power source Vcc through the primary winding 21a is interrupted with a high voltage consequently generated across the secondary winding 21b, and a distributor 22 for distributing the high voltage from the ignition coil assembly 21 to the individual spark plugs 2a to 2d.

While the control device according to this invention is constructed as hereinbefore described, it operates in the following manner.

When and so long as the engine 1 is in operation, the vibration sensor 3a detects vibrations of the engine and generates an output signal indicative of the magnitude of the vibrations so detected while the crank angle sensor 4 detects the crank angle and generates an output signal corresponding thereto. In the knocking detector 3, the bandpass filter 9 passes that frequency component of the output signal from the vibration sensor 3a which is attributable to the occurrence of the engine knocking. The averaging circuit 10 serves to average the output from the bandpass filter 9, and the comparator 11 compares the output from the bandpass filter 9 with the output from the averaging circuit 10. Where no knocking has occurred in any one of the engine cylinders, the output from the bandpass filter 9 is of a value equal to that of the output from the averaging circuit 10 and, therefore, the output from the comparator 11 is "0" and the output from the integrator 12 is consequently maintained zero.

Figure 3:
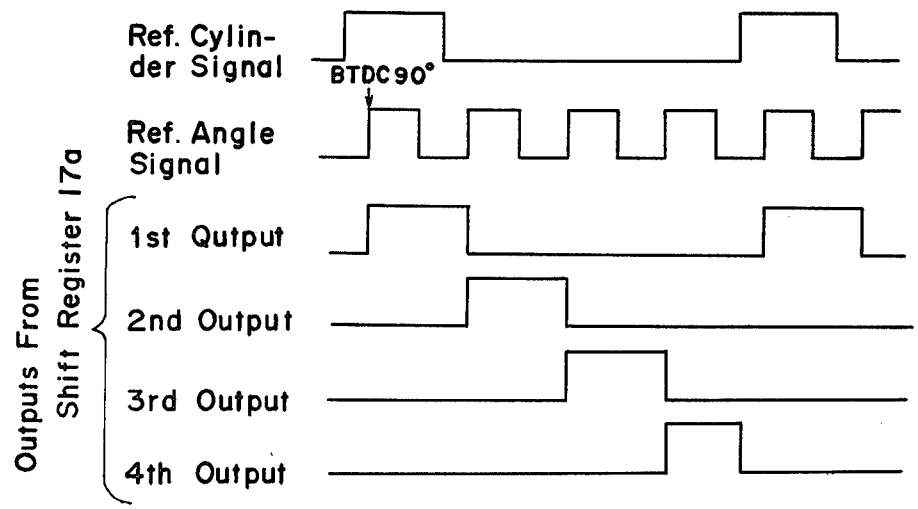
FIG. 3 is a chart showing various waveforms of signals appearing in the circuit of FIG. 3.

In the cylinder control unit 7, the arithmetic circuit 13 calculates the ignition timing in dependence on the engine speed and the suction negative pressure and applies the output indicative of the calculated ignition timing to all of the first to fourth ignition timing determining circuits 18a to 18d. On the other hand, the comparator 14, when it receives the output from the integrator 12, compares it with the reference voltage fed from the reference voltage source 15. Since the output from the integrator 12 is zero at this time, the output from the comparator 14 is "0" and the output from the gating circuit 16 is therefore "0". In this condition, the knocked cylinder identifying circuit 17 does not generate any cylinder control signal regardless of the outputs from the shift register 17a. Specifically, since the shift register 17a is so designed as to operate in such a manner that, upon receipt of both of the reference cylinder signal and the reference angle signal from the crank angle sensor 4, the waveforms of which are shown in FIG. 3, output signals corresponding to the engine cylinders to be fired can sequentially emerge from the respective output terminals as shown in FIG. 3, which are in turn fed to the associated gating circuits 17b, 17c, 17d and 17e one at a time to cause them to conduct in a predetermined sequence, the knocked cylinder identifying circuit 17 does not generate any output signal, when and so long as no input signal is fed to any one of the first to fourth gating circuits 17b to 17e, regardless of whether or not the gating circuits 17b to 17e are caused to conduct. It is to be noted that, in the embodiment so far illustrated, the reference cylinder signal is generated when the piston in the first engine cylinder is brought in a position adjacent the top dead center while the reference angle signal is generated when the crankshaft is rotated to a position 90° before the piston in each of the first to fourth engine cylinders reaches the top dead center. Accordingly, the first to fourth determining circuits 18a to 18d are operable upon receipt of the output signal from the arithmetic circuit 13 to advance the reference ignition timings for the respective engine cylinders a predetermined angle to establish the actual ignition timings for these engine cylinders. Since the output from the comparator 14 is "0" in the instance so far described, the multiplier 19e of the distributor control circuit 19 causes the respective outputs from the first to fourth determining circuits 18a to 18d to be sequentially passed from the corresponding gating circuits 19a to 19d to the timer 19f in dependence on the cylinder identifying signals fed from the shift register 17a. The timer 19f, when triggered by the reference signal fed from the crank angle sensor 4, discharges at a predetermined time constant the voltage corresponding to the signal from the multiplier 19e, that is, the voltage corresponding to the ignition timing. When the output from the timer 19f is lower than the reference voltage of the reference voltage source 19h, that is, when the crank angle is of a value required for igniting the spark plug, a low level signal is outputted from the comparator 19g and is in turn fed to the spark plug igniting control circuit 8. Each time the low level signal from the comparator 19g is fed to the control circuit 8, the control circuit 8 produces the high voltage which is in turn distributed by the distributor 22 to the individual spark plugs 2a to 2d to ignite the latter. In this way, the first to fourth engine cylinders can be fired at the respective ignition timings appropriate to a particular operating condition of the engine.

However, in the event that the knocking of a level lower than the predetermined value has occurred in one of the engine cylinders, for example, in the first engine cylinder, during the operation of the engine, in the knocking detector 3, the output from the bandpass filter 9 is of a value higher than the output from the averaging circuit 10 and, therefore, the output of the comparator 11 is "1" which is turn integrated in the integrator 12. The output from the integrator 12 is of a value proportional to the time during which the output from the comparator 11 is "1". In the cylinder control unit 7, since the output from the integrator 12 is of a value lower than the reference voltage from the reference voltage source 15, the output from the comparator 14 is "0" and the gating circuit 16 is consequently brought in a conducting state. When this happens, the knocked cylinder identifying circuit 17 causes one of the gating circuits 17b to 17e which is associated with the knocked engine cylinder, that is, the gating circuit 17b, to conduct in dependence on both the output from the gating circuit 16 and applies the knocking signal to the first ignition timing determining circuit 18a which then operates to retard the reference ignition timing, which has been determined by the arithmetic circuit 13, a predetermined angle corresponding to the knocking occurring in the first engine cylinder to establish the actual ignition timing. In this way, since the ignition timing for the first engine cylinder is retarded, the knocking will no longer take place in the first engine cylinder while the second to fourth engine cylinders are fired at the respective proper ignition timings as is the case with the foregoing, thereby substantially eliminating any possible reduction in engine power output and mileage.

Where the level of the knocking occurring in the first engine cylinder is higher than the predetermined value, there is a great possibility that knocking would be induced also in the other engine cylinders. In such case, in the cylinder control unit 7, since the output from the integrator 12 is of a value higher than the reference voltage from the reference voltage source 15 and the output from the comparator 14 is "1", the output from the gating circuit 16 is "0" and, therefore, the knocked cylinder identifying circuit 17 does not generate any knocking signal. Accordingly, the multiplier 19e of the distributor control circuit 19 operates in response to the output from the comparator 14 to produce a signal required to retard a predetermined angle the ignition timing for all of engine cylinders which has been determined by the respective determining circuit 18a to 18d, which signal is then fed to the timer 19f. Subsequently, a firing signal required to fire the engine cylinders at crank angles corresponding to the respective retarded ignition timing is fed to the spark plug igniting control circuit 8 and, therefore, not only does no knocking take place in the first engine cylinders, but also any possible occurrence of the knocking in the second to fourth engine cylinders can be avoided. It is to be noted that the delay circuit 19i employed in the foregoing embodiment is provided for synchronizing the time during which charge is effected with the time during which discharge is effected and is operable to delay a predetermined time the reference angle signal fed from the crank angle sensor 4.

Figure 4:
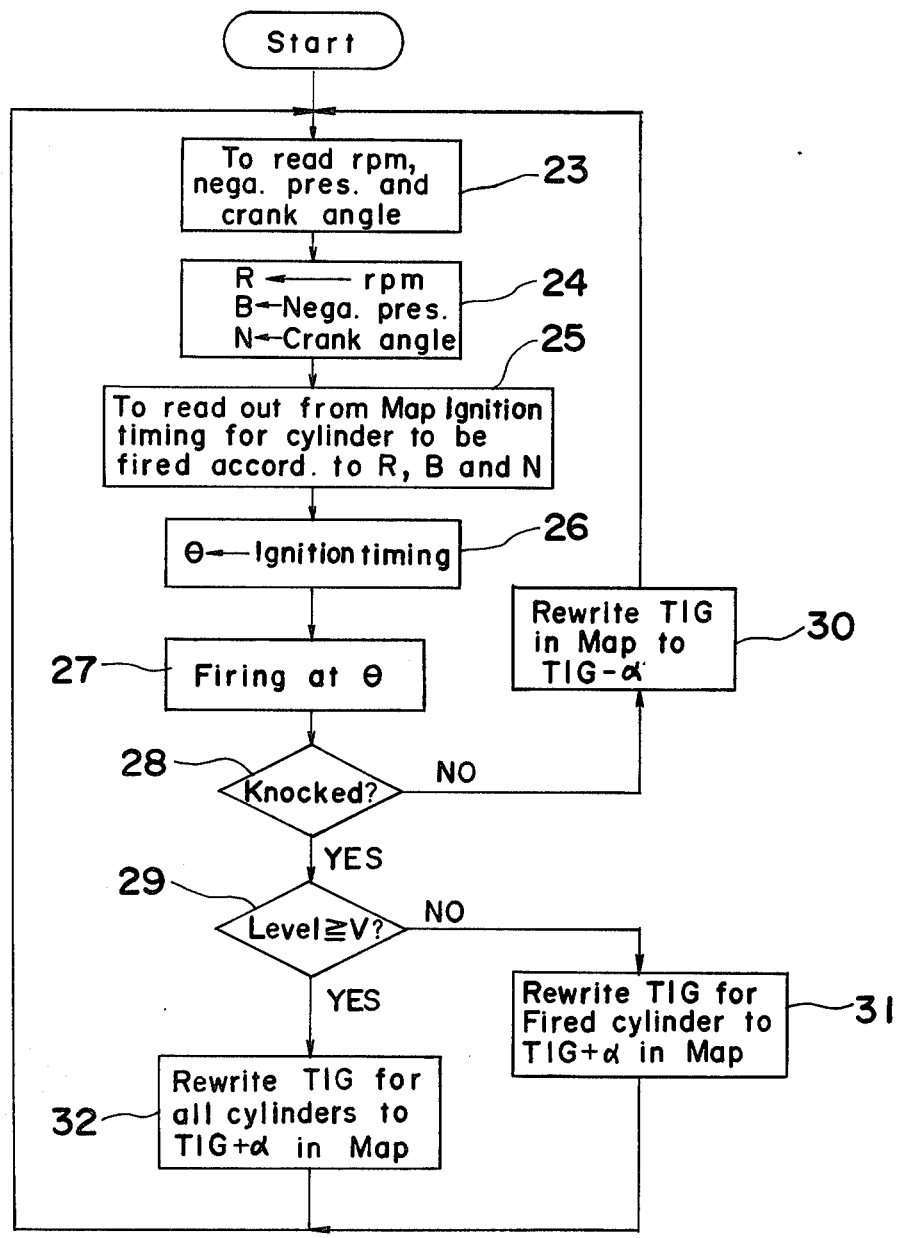
FIG. 4 is a flow chart showing the sequence of operation of a central processing unit according to another embodiment of this invention.

While the embodiment shown in and described with reference to FIGS. 1 to 3 is such as to carry out the required control by way of the hardwares, the embodiment shown in FIG. 4 is such as to carry out the required control by way of a software using a computer. For this purpose, FIG. 4 illustrates a flow chart of the arithmetic operation performed by a central processing unit.

Referring now to FIG. 4, reference numeral 23 represents the step at which the engine speed (rpm), the suction negative pressure and the crank angle are read in from respective outputs of sensors; reference numeral 24 represents the step at which the engine speed, the suction negative pressure and the crank angle are written in respective memories R, B and N of a storage device; and reference numeral 25 represents the step at which the ignition timing TIG is read out from a map be designating an address specified by the engine speed, the suction negative pressure and the crank angle. The map hereinabove referred to is the one in which the ignition timing for each of the engine cylinders determined in dependence on the engine speed and the suction negative pressure is written in the address of the memory which is determined by the engine speed, the suction negative pressure and the crank angle representative of the particular engine cylinder.

Reference numeral 26 represents the step at which the ignition timing read out is written in a memory $\theta$; reference numeral 27 represents the step at which the engine cylinder determined by the crank angle is fired at the ignition timing stored in the memory $\theta$; reference numeral 28 represents the step at which the output from the vibration sensor 3a is read in and determination is made as to whether or not knocking has occurred in the engine; reference numeral 29 represents the step at which determination is made as to whether or not the output from the sensor 3a, that is, the level of the knocking, is higher than the predetermined value V; reference numeral 30 represents the step at which the ignition timing TIG at the above described address in the map is rewritten to the ignition timing TIG− which is the ignition timing TIG advanced a predetermined angle $\alpha$; reference numeral 31 represents the step at which the ignition timing TIG at the above described address in the map is rewritten to the ignition timing TIG+$\alpha$ which is the ignition timing TIG retarded a predetermined angle; and reference numeral 32 represents the step at which the ignition timing TIG for each of the engine cylinders is rewritten to the ignition timing TIG+$\alpha$.

The operation will now be described.

The central processing unit reads in the engine speed, the suction negative pressure and the crank angle at the step 23; writes the engine speed, the suction negative pressure and the crank angle in the respective memories R, B and N of the storage device at the step 24; reads the ignition timing TIG from the map by specifying the addresses determined by the respective values of the memories R, B and N at the step 25; writes the ignition timing TIG in the memory $\theta$ at the step 26; causes the engine cylinder determined by the crank angle to be fired at the ignition timing in the memory $\theta$ at the step 27; and determines at the step 28 as to whether or not knocking has occurred in the engine cylinder then fired. Where no knocking has occurred in the engine, the process proceeds to the step 30 at which the ignition timing TIG at the above described address of the map is rewritten to the ignition timing TIG−$\alpha$ and then proceeds back to the step 23. Thus, where no knocking has occurred in the engine cylinders, the central processing unit successively advances the ignition timings TIG the predetermined angle so that the engine power output and the mileage can be improved.

Where the ignition timing TIG has been excessively advanced with knocking consequently occurring in one of the engine cylinders, the central processing unit proceeds from the step 28 to the step 29 at which determination is made as to whether or not the level of the knocking is higher than the predetermined value V. If the knocking level is lower than the predetermined value V, the process proceeds to the step 31 at which the ignition timing TIG at the above described address in the map is rewritten to the ignition timing TIG+$\alpha$, that is, retarded the predetermined angle α, so that the occurrence of the knocking in such one of the engine cylinders can be minimized. On the other hand, if the knocking level is higher than the predetermined value V, the central processing unit proceeds from the step 29 to the step 32 at which the ignition timing TIG for each of the engine cylinders at the particular engine operating condition is rewritten to the ignition timing TIG+α, that is, retarded the predetermined angle α, so that the occurrence of the knocking in such one of the engine cylinders can be minimized on the one hand and any possible occurrence of the knocking in any one of the other engine cylinders can be avoided on the other hand. In summary, in the absence of the knocking, the process consisting of the steps 23 to 28 and 30 is performed to sequentially advance the ignition timings. However, in the presence of the knocking of the relatively low level, the process consisting of the steps 23 to 29 and 31 is performed to retard the ignition timing for one or more of the engine cylinders in which the knocking has actually taken place. On the other hand, in the presence of the knocking of the relatively high level, the process consisting of the steps 23 to 29 and 32 is performed to retard the ignition timing for all of the engine cylinders. In this way, a feed-back control is effected so properly that both the engine power output and the mileage can be increased with the ignition timing controlled so as to substantially avoid, or minimize, the occurrence of engine knocking.

It is to be noted that, although the control done by the use of the software construction shown in FIG. 4 differs from the control done by the use of the hardware construction shown in FIG. 2, the control done by the use of the hardware construction shown in FIG. 2 can be carried out by the use of a software construction.

From the foregoing description of the preferred embodiment of this invention, it has now become clear that, in the multicylinder engine wherein the operation condition control device for governing the operating condition of the engine is so designed as to be adjusted in dependence on the output from the knocking detector, the occurrence of knocking in one or more of the engine cylinders is detected on the one hand and, on the other hand, the above described adjustment is effected only to one or more of the engine cylinders, in which knocking has actually taken place, if the level of the knocking is lower than the predetermined value, and to all of the engine cylinder if the knocking level is higher than the predetermined value. Accordingly, with the control device according to this invention, the occurrence of the engine knocking can effectively be minimized with no reduction in engine power output and mileage.

Although this invention has fully been described in connection with the preferred embodiments thereof with reference to the accompanying drawings, it is to be noted that various changes and modifications are apparent to those skilled in the art. By way of example, although the use of the crank angle sensor for detecting the rotation of the crankshaft has been referred to in the foregoing description, it may be replaced with a sensor for detecting firing pulses or the rotation of a cam shaft.

In addition, although the control device embodying this invention has been described and shown in the form of the ignition timing control device, it may be an EGR control device or an air-fuel ratio control device. In the case of the EGR control device, the rate of flow of the exhaust gases being recirculated by means of an EGR device which stands for the operating condition control device in such cases should be increased in order to minimize the occurrence of engine knocking. However, in the case of the air-fuel ratio control device, the rate of supply of fuel to be controlled by a fuel supply device which stands for the operating condition control device in such case should be increased to enrich the ultimately formed air-fuel mixture.

Accordingly, such changes and modifications are to be understood as included within the true scope of this invention as defined by the appended claims, unless they depart therefrom.

I claim:

1. A control device in combination with a multicylinder internal combustion engine having a plurality of engine cylinders adapted to be fired in a predetermined order, fuel combustion means in each cylinder and actuating means for actuating said fuel combustion means in said predetermined order, said control device comprising:

vibration sensing means operably connected to said engine for sensing engine vibration and generating a first signal in accordance therewith;

knock detecting circuit means connected to said vibration sensing means for receiving said first signal, and separating from said first signal any portion thereof which is generated by engine knock and generating a second signal in accordance therewith;

crank angle sensing means operably connected to said engine for sensing the crank angle of the engine and generating a third signal in accordance therewith; and a control circuit operably connected to said actuating means and to said knock detecting circuit means and said crank angle sensing means and including first circuit means for comparing said second and third signals to identify an engine cylinder in which knocking has occurred, and for providing a fourth signal to said actuating means in response to said second signal, when said second signal is below a predetermined value, to retard the actuation of the respective fuel combustion means, and second circuit means for providing a signal to said actuating means, when said second signal is above said predetermined value, to retard the actuation of all of said fuel combustion means.

2. A control device according to claim 1, wherein said knock detecting circuit means includes a bandpass filter which receives said first signal and passes a frequency component thereof which corresponds to engine knocking.

3. A control device according to claim 1, wherein said fuel combustion means is a spark plug and said actuating means is a distributor.

4. A control device for a multicylinder internal combustion engine having a plurality of engine cylinders adapted to be fired at a predetermined order, which control device comprises, in combination:

a knocking detecting circuit means for detecting the occurrence of knocking in dependence on a signal indicative of vibrations of the engine;

a crank angle sensor means for generating a signal indicative of the crank angle of the engine;

an engine operating condition control means for controlling a parameter determinative of the combustion of a combustible fuel in each engine cylinder;

a control circuit means for identifying at least one of the engine cylinders in which the knocking has actually occurred, by comparing an output signal from the detecting circuit means indicating the occurrence of the knocking and an output signal from the crank angle sensor indicating the crank angle of the engine, said control circuit means being connected to said engine operating condition control device to adjust said parameter in a direction required to suppress the occurrence of knocking in said at least one of said cylinders when the level of the knocking so detected is lower than a predetermined level, and to suppress the occurrence of knocking in all of said engine cylinders when the level of knocking so detected is higher than the predetermined level.

5. A control device as claimed in claim 4, wherein said parameter constitutes an ignition timing, and the engine operating condition control device is an ignition timing control device.

6. A control device as claimed in claim 4, wherein the crank angle sensor means generates a reference cylinder signal indicative of a predetermined one of the engine cylinders and a reference angle signal indicative of a predetermined crank angle, said control circuit means counting the number of the reference angle signals generated subsequent to the generation of the reference cylinder signal.

* * * * *